(12) United States Patent
Griffiths et al.

(10) Patent No.: US 8,136,546 B2
(45) Date of Patent: Mar. 20, 2012

(54) PRESSURE RELIEF VALVE

(75) Inventors: Ian Griffiths, Eastleigh (GB); Paul Hubbard, Eastleigh (GB); Malcolm Jones, Eastleigh (GB)

(73) Assignee: Prysmian Cables & Systems Limited, Hampshire (GB)

( * ) Notice: Subject to any disclaimer, the term of this patent is extended or adjusted under 35 U.S.C. 154(b) by 775 days.

(21) Appl. No.: 12/087,213

(22) PCT Filed: Dec. 28, 2005

(86) PCT No.: PCT/GB2005/005103
§ 371 (c)(1),
(2), (4) Date: Dec. 4, 2008

(87) PCT Pub. No.: WO2007/074321
PCT Pub. Date: Jul. 5, 2007

(65) Prior Publication Data
US 2009/0178715 A1 Jul. 16, 2009

(51) Int. Cl.
*F16K 15/06* (2006.01)
*E21C 29/16* (2006.01)
*G02B 6/44* (2006.01)

(52) U.S. Cl. .............. 137/513; 251/366; 254/134.4

(58) Field of Classification Search .............. 137/512.5, 137/513; 251/358, 366; 254/134.4, 134.3 R
See application file for complete search history.

(56) References Cited

U.S. PATENT DOCUMENTS

| 822,077 A * | 5/1906 | Rich .............................. 137/513 |
| 1,030,447 A * | 6/1912 | Allen ............................. 137/513 |
| 1,493,149 A * | 5/1924 | Crandall ........................ 137/513 |
| 3,310,277 A * | 3/1967 | Nielsen et al. ................ 251/358 |
| 3,762,443 A * | 10/1973 | Sorenson ....................... 251/366 |
| 4,015,623 A * | 4/1977 | Wanstreet ...................... 137/513 |
| 4,822,005 A * | 4/1989 | Aleshire ...................... 254/134.4 |
| 5,215,114 A | 6/1993 | Breyer |
| 5,215,117 A | 6/1993 | Petersen et al. |
| 6,435,208 B1 | 8/2002 | Van der Velde |
| 6,631,884 B2 * | 10/2003 | Griffioen et al. ........... 254/134.4 |
| 6,681,795 B2 * | 1/2004 | Beals et al. ................. 254/134.4 |
| 7,207,208 B2 * | 4/2007 | Sutehall ........................ 73/37.5 |
| 7,562,861 B2 * | 7/2009 | Fee et al. .................... 254/134.4 |
| 2006/0219992 A1 * | 10/2006 | Fee et al. .................... 254/134.4 |

FOREIGN PATENT DOCUMENTS
EP 0 547 863 A1 6/1993
GB 1 601 130 12/1977
WO WO 2005/038325 A1 4/2005

* cited by examiner

*Primary Examiner* — John Rivell
(74) *Attorney, Agent, or Firm* — Finnegan, Henderson, Farabow, Garrett & Dunner, L.L.P.

(57) ABSTRACT

A pressure relief valve for blown fiber closures is provided having constituent components fabricated from plastic. An adaptor is provided for connection to a blown fiber closure, and a body welded to this adaptor, is provided to enclose a piston and a spring within, such that they are protected from the ingress of silt and water. The piston is arranged to provide a double seal such that a pressure relief valve plug and an opening in the enclosing body are closed or opened simultaneously to prevent the ingress of silt and/or water on the one hand and the unhindered escape of pressurized fluid on the other.

13 Claims, 3 Drawing Sheets

PRESSURE RELIEF VALVE

CROSS REFERENCE TO RELATED APPLICATION

This application is a national phase application based on PCT/GB2005/005103, filed Dec. 28, 2005, the content of which is incorporated herein by reference.

FIELD OF THE INVENTION

This invention relates to a pressure relief valve such as for use in the field of fibre optic installations.

BACKGROUND TO THE INVENTION

Developments in fibre optic cable installation have seen a move from traditional cable installation using heavy, reinforced cables to the use of blown fibre techniques.

Traditional installation of optical fibres underground has often subjected them to high pulling forces, as they are pulled into ducts by pulling machines. Since optical glass cannot survive more than a few percent elongation, it has to be protected from these tensile forces by strength members which may be steel ropes, glass-reinforced rods, or Aramid yarns. These make traditionally installed optical cables heavy, bulky, stiff, expensive, and also increase stripping and handling time.

Strength members are not required in blown fibre cables which instead use just airflow to install fibres into pre-installed tubes. This technique exposes fibres to almost zero stress, and so no reinforcement of the optical fibre is needed. This in turn confers advantages for multi-branching access networks in that fibre lifetime is preserved in full, there is much less splicing, dead fibres can be eliminated, network planning is simpler, less manpower is required for installation and future upgrades are quicker and easier.

As each of the preinstalled tubes is installed below ground level it is important that it is able to protect the fibres within from the external environment in order to prevent damage to the fibre and subsequent degradation of signal transmission. Currently, these tubes have blown fibre closures at their open ends which perform the tasks of sealing the tubes to prevent the ingress of silt and/or water and allowing connections with other tubes. If, in the process of installation or maintenance of the optical network, an installer attempts to blow a fibre through a tube using high pressure air (e.g. at 10 bar), and the tube has not been configured correctly, the closure may become pressurised resulting in possible explosion or injury to an installer if he attempts to open the closure when pressurised.

Pressure relief valves exist that are designed to relieve this excess pressure in the closure. For instance, document GB1601130 discloses a valve having a plunger which is moveable towards and away from an annular seat surrounding an inlet port. The plunger has a nose constituted in part by a flat annular metal portion adapted to be brought into metal-to-metal contact with a flat annular seating surface on the valve seat. When the plunger nose is in contact with the valve seat, a raised ridge of the valve seat enters into a recess in the nose of the plunger where it is pressed into resiliently deforming contact with part of an elastomeric sealing ring which occupies the recess, thus closing the port. The plunger is arranged to open at a predetermined pressure in order to relieve any excess pressure from the closure, ensuring that it is always safe to open.

The Applicant has noticed that current pressure relief valves have a major fault in that the body of the valve, i.e. the part sitting outside of the closure, is not sealed and contains large holes to allow air to escape. Since the underground chambers in which these closures are normally installed are often filled with silt and water, the Applicant has noticed that when such a valve is installed and the device remains inactive for a significantly long period of time, it is a common shortcoming for the body housing the plunger mechanism to become blocked with silt and/or water thus blocking the free movement of the plunger and the escape of pressurised air. Moreover, the ingress of water and/or silt may also give rise to a deterioration of sealing performance or valve sticking which results in the valve failing to open at the predetermined set pressures.

The Applicant has perceived the need of improving the pressure relief valves which are generally used in the field of fibre optic installations in order to increase reliability and the safety thereof, even when the closures are at least partially dipped in water and/or silt, so that the drawbacks mentioned above can be avoided or at least remarkably reduced.

SUMMARY OF THE INVENTION

The Applicant has found that the results mentioned above can be advantageously achieved by providing the pressure relief valve with a double sealing action so that also the valve body that is positioned outside the closure is suitably sealed to prevent water or silt from blocking the operation of the valve.

Therefore, the present invention relates to a pressure relief valve which comprises a primary seal and a secondary seal, said primary and secondary seals surrounding an enclosure to be sealed, said secondary seal opening and closing together with the primary seal.

In particular, the primary seal may be a pressure release mechanism and the secondary seal may seal a body around the pressure release mechanism.

In detail, according to the present invention, the pressure relief valve comprises: an adaptor for connecting the pressure relief valve to a blown fibre closure, wherein the adaptor is arranged at a first end for connecting to a high pressure fluid source, and has, at a second end, a recess forming a valve seat; a piston adapted to be moveable between a first position in which it is arranged to block the valve seat and a second position in which it is arranged to unblock the valve seat; a spring adapted for urging the piston towards the first position; and a body enclosing the valve seat, spring and piston wherein the body has an external opening and wherein the piston has a sealing plug adapted to plug said opening when the piston is in the first position and to unblock the opening when the piston is in the second position.

One advantage of the present invention is that the pressure relief valve is sealed against the ingress of silt and/or water thus preserving sealing performance. A further advantage of the present invention is that the pressure relief valve may be fabricated from plastics material, which will drastically reduce the cost of the item compared to contemporary products on the market that are generally made from brass.

The significant parts of one embodiment of a pressure relief valve according to this invention will now be described, by way of example only, with reference to the drawings.

DESCRIPTION OF THE EMBODIMENTS

Figure 1:
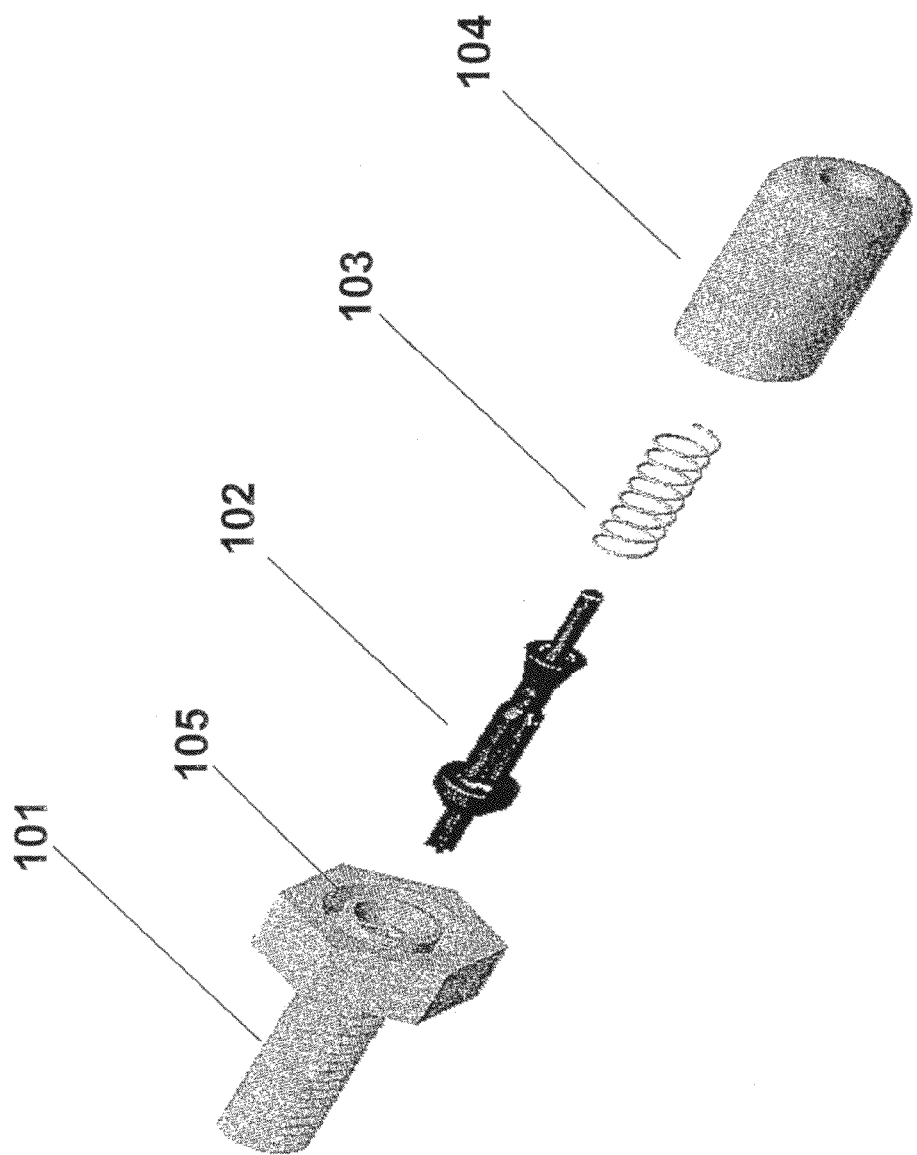
FIG. 1 is an exploded diagram showing the general arrangement of parts within the pressure relief valve.

With reference to FIG. 1 the pressure relief valve is composed of four components: an adaptor 101, a piston 102, a spring 103 and a body 104.

Figure 2:
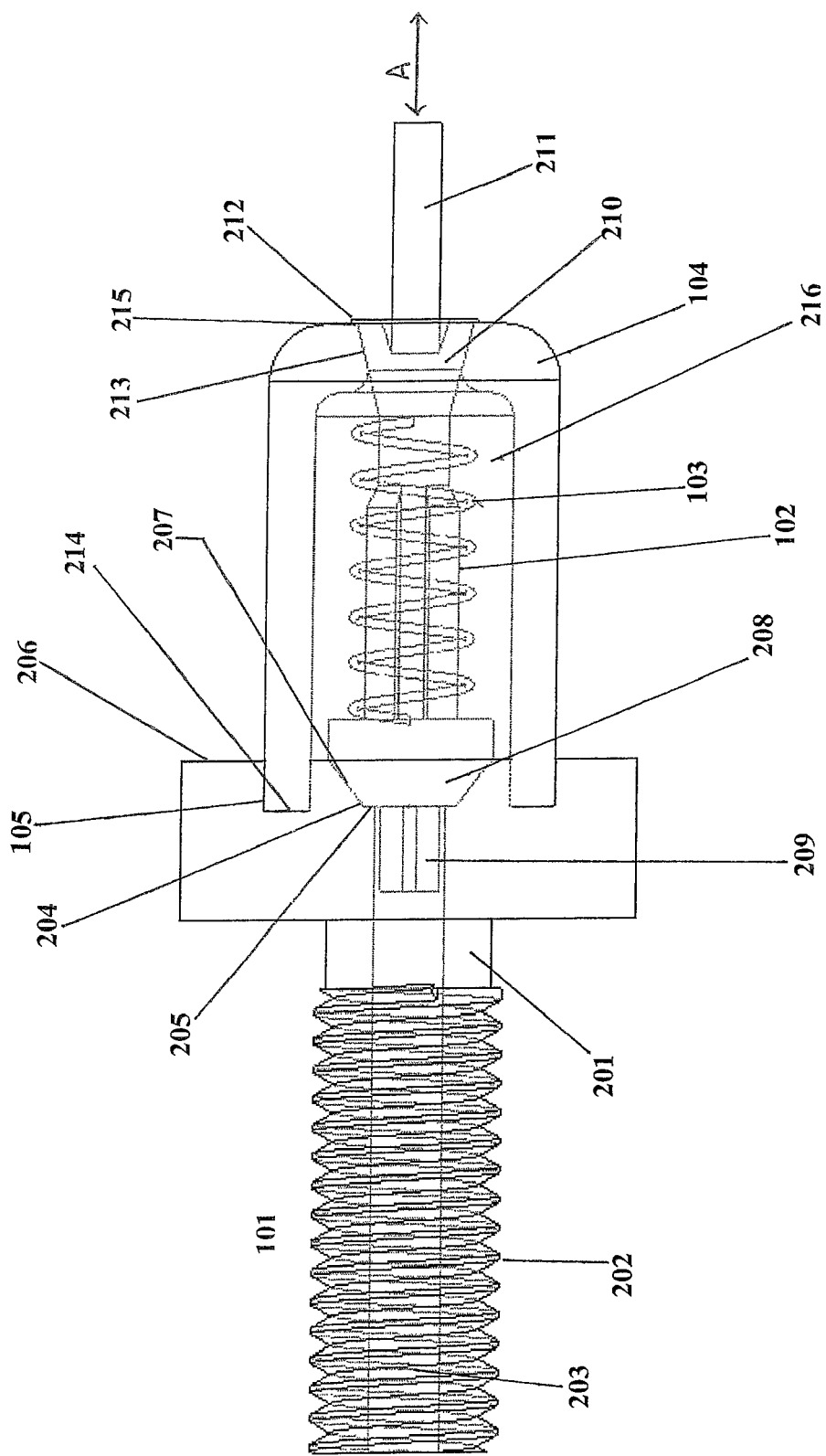
FIG. 2 is a schematic diagram of a preferred embodiment of the pressure relief valve in its closed state.
Figure 3:
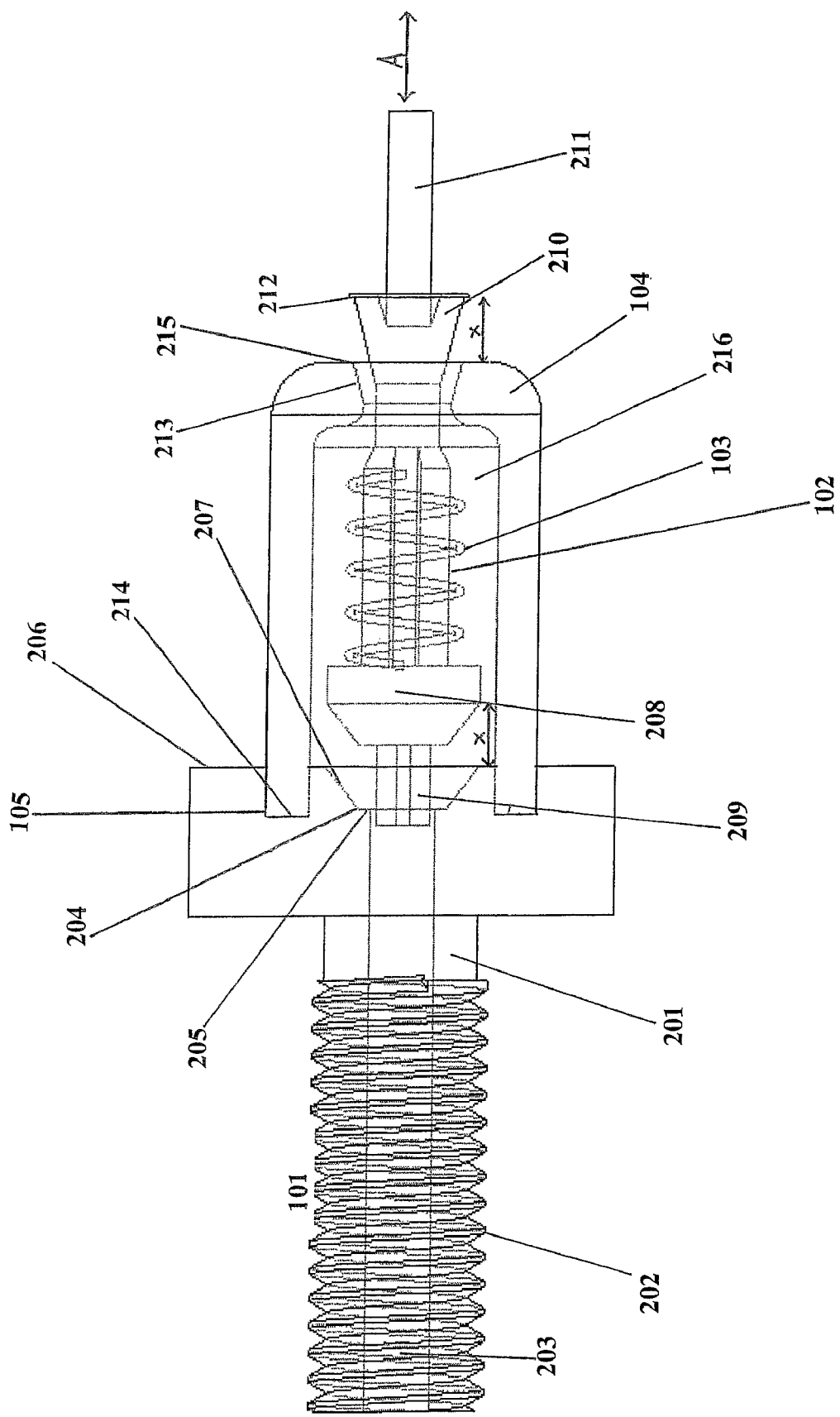
FIG. 3 is a schematic diagram of a preferred embodiment of the pressure relief in its open state.

Referring more specifically to FIGS. 2 and 3 they show a simplified diagrammatic vertical cross sectional view of the pressure relief valve in its closed and open states respectively, as defined by preferred embodiments of the present invention. The adaptor 101 comprises a cylindrical body 201, which in one embodiment may be 8 mm long. The cylindrical body 201 preferably has an external thread 202 and a central longitudinal internal bore 203 to allow the free passage of fluid through the cylindrical body 201.

The externally threaded section 202 of the adaptor 101 is arranged for installation into a "Blown Fibre" closure, and a locking nut (not shown in the figures) is generally utilised to secure the adaptor cylindrical body 201 to the closure. A standard sealing washer can be placed over the external thread 202 so as to be sandwiched between the face of the locking nut and the face of the closure, thus providing a seal between the adaptor 101 and the closure.

At the distal end of the adaptor 101 the internal bore 203 extends into a frusto-conical disc shaped throat 204 wherein the smallest diameter of the frusto-conical disc shaped throat 204 is larger than the diameter of the internal bore 203 thus forming an annular discontinuity 205. Thus a valve seat 207 is formed by the recess created by the frusto-conical disc-shaped throat 204 in the surrounding flat annular surface 206. Surrounding the valve seat 207 is an annular groove 105 formed into the flat annular surface 206.

The valve seat 207 formed by the frusto-conical disc-shaped throat 204 is connected to the inlet bore 203 and is adapted to be obturated by a piston, generally designated 102, which is movable along direction A that is substantially parallel to the longitudinal axis of the valve. The piston 102 is preferably a two part moulding consisting of a central cylindrical spindle (not shown in the figures), around which is moulded an elastomeric material to provide the profiles of a valve plug 208 and a sealing plug 210. In a preferred embodiment, the central cylindrical spindle may be a glass reinforced plastic, and the elastomeric material may be a thermoplastic rubber. The piston 102 is urged towards the valve seat 207 by spring 103 (which may be a helical spring, a leaf spring or any component exerting a spring force). As will be known by those skilled in the art, the biasing force exerted by the spring 103 is set by pre-adjustment during manufacture to achieve opening of the pressure relief valve at a specific difference between the pressure of the fluid in the inlet bore 203 relative to the pressure in the discharge region.

The end of the piston 102 adjacent to the valve seat 207 has a valve plug 208, the shape of which is manufactured to match the recess of the valve seat 207 formed by the frusto-conical throat 204. The piston has a further portion 209 projecting forward of the valve plug 208, the diameter of which is marginally smaller than the internal bore 203.

At the end of the piston 102 furthest from the valve seat 207, the piston 102 extends into a sealing plug 210. A portion 211 of the piston extends rearwards of this sealing plug. This sealing plug 210 again takes the form of a frusto-conical disc wherein the elastomeric material has been cored out, or moulded with a hollow annular recess, in order to increase flexibility. This frusto-conical disc terminates in an annular overhang 212 that has a diameter larger than the opening 213 in the body 104.

The piston 102 and spring 103 are enclosed by the cylindrical body 104, which is ultrasonically welded around its annulus 214 into the annular groove 105 in the flat annular surface 206 of the adaptor 101. The body 104 is closed at the end opposite the adaptor 101. The closed end has a centrally located opening 213 through which the rearward extension 211 of the piston may pass. The centrally located opening 213 in the body 104 has the same frusto-conical disc shape as the sealing plug 210.

The spring 103 fits concentrically over the piston 102, the coils of which are of a sufficient diameter to allow unobstructed movement of the piston 102 within. The spring 103 is attached at one end to the rear of the valve plug 208 and to the interior body 104 surrounding the opening 213 at its opposite end. In a preferred embodiment the spring resistance may be calculated to allow the valve to open at approximately 35 kPa.

In the closed condition of the valve as depicted in FIG. 2, the valve plug 208 abuts directly against the valve seat 207 whilst the portion 209 of the piston forward of the valve plug 208 locates into the internal bore 203.

In the open condition of the valve as depicted in FIG. 3, the valve plug 208 and portion 209 of the piston 102 forward of the valve plug 208 are withdrawn from the frusto-conical recess of the throat 204 a distance X, allowing the free flow of fluid from the inlet bore 203 into the cavity 216 formed by the body 104 and the flat annular surface 206. The distance X is dependent on the balance between the pressure exerted on valve plug 208 by the escaping fluid and the resisting force of the spring 103 but should not be sufficient to allow the portion 209 of the piston forward of the valve plug 208 to be entirely retracted from the inlet bore 203.

In the closed condition of the valve as depicted in FIG. 2, the sealing plug 210 abuts directly against the annular frusto-conical surface of the opening 213 in the body 104 whilst the annular overhang 212 of the sealing plug 210 comes to lie against the exterior surface of the body surrounding the opening 215. The portion 211 of the piston 102 rearwards of the sealing plug 210 extends into free space beyond the boundary of the body 104.

In the open condition of the valve as depicted in FIG. 3, the sealing plug 210 is withdrawn distance X from the frusto-conical disc shaped opening in the body 213, thus allowing the free flow of fluid from the cavity 216 formed by the body 104 and the flat annular surface 206, into the external environment, i.e. outside the valve body.

A particular advantage of the embodiment of the invention depicted in FIGS. 1 to 3 is that the valve plug 208 and the sealing plug 210 of the piston 102 are mounted on the same shaft and arranged so that when the valve plug 208 is in a position that seals the inlet bore 203, then the sealing plug 210 is in a position that seals the opening in the body 213. Furthermore, when the valve plug 208 is removed from the opening of the inlet bore 203 then the sealing plug 210 is removed by the same distance from the opening in the body 213 thus resulting in the simultaneous opening of the inlet bore 203 and the body opening 213.

This double sealing arrangement allows the body of the pressure relief valve to be sealed against the ingress of silt and water whenever the inlet bore is also sealed due to the fluid pressure in the inlet bore being below a predetermined safe level. Once this level is reached however the inlet bore is unsealed by the pressure of the fluid within the inlet bore acting against the face of the valve plug 208 on the piston 102 allowing fluid to enter the cavity 216 formed by the body 104.

This same movement of the piston 102 to unseal the inlet bore 203 also moves the sealing plug to unseal the opening in the body 213 thus allowing fluid to escape unimpeded from the inlet bore 203 to the outside of the body 104. Subsequently, as the pressure of the fluid in the inlet bore 203 falls, the spring 103 is eventually effective to move the piston 102 towards the valve seat 207 and the valve plug 208 will reengage with the frusto-conical disc shaped throat 204 thus sealing the inlet bore 203 and the sealing plug 210 will reengage with the opening in the body 213 thus sealing the body 104.

The invention claimed is:

1. A pressure release valve, comprising:
    a primary seal and a secondary seal, said primary and secondary seals surrounding an enclosure to be sealed, said secondary seal opening and closing together with the primary seal;
    an adaptor for connection to a blown fibre closure, said blown fibre closure being arranged at a first end of said adapter for connecting to a high pressure fluid source, said adaptor being provided at a second end thereof with a recess forming a valve seat;
    a piston adapted to be moveable between a first position in which the piston is arranged to block the valve seat and a second position in which the piston is arranged to unblock the valve seat, said piston being provided with a sealing plug;
    a spring adapted for urging the piston toward the first position; and
    a body enclosing the valve seat, spring and piston, said body being provided with an external opening, wherein the sealing plug is adapted to plug said external opening when the piston is in the first position and to unblock said external opening when the piston is in the second position,
    wherein the piston comprises a cylindrical spindle surrounded by elastomeric material shaped to form the valve plug and sealing plug.

2. The pressure relief valve of claim 1, wherein the valve seat and the external opening in the body are longitudinally coplanar.

3. The pressure relief valve of claim 1, wherein the piston further comprises a radial extension adapted to form a frusto-conical valve plug in correspondence with the second end of said adaptor.

4. The pressure relief valve of claim 3, wherein the frusto-conical valve plug is provided with a portion adapted to project forward of the valve plug into an inlet bore of the adaptor.

5. The pressure relief valve of claim 1, wherein the sealing plug is in the form of a frusto-conical disc.

6. The pressure relief valve of claim 1, wherein the sealing plug is provided with a portion adapted to project rearward of the sealing plug.

7. The pressure relief valve of claim 1, wherein the sealing plug comprises a cored out annular section which makes said sealing plug more flexible than the body of the piston.

8. The pressure relief valve of claim 3, wherein the sealing plug is in the form of a frusto-conical disc and the cone angle of the frusto-conical disc is lesser than the cone angle of the valve plug.

9. The pressure relief valve of claim 1, wherein the sealing plug has an annular lip having a diameter greater than the diameter of the external opening of the body.

10. The pressure relief valve of claim 1, wherein the body is fabricated from a thermosetting plastic material.

11. The pressure relief valve of claim 1, wherein the body is welded to the adaptor so as to encapsulate the spring, piston and valve seat.

12. The pressure relief valve of claim 11, wherein the welding is ultrasonic.

13. A method of providing pressure relief in a blown fibre closure, said blown fibre closure being associated with a pressure relief valve according to claim 1.

* * * * *